United States Patent [19]

Burton et al.

[11] Patent Number: 5,522,086
[45] Date of Patent: May 28, 1996

[54] SOFTWARE CONFIGURABLE ISA BUS CARD INTERFACE WITH SECURITY ACCESS READ AND WRITE SEQUENCE TO UPPER DATA BITS AT ADDRESSES USED BY A GAME DEVICE

[75] Inventors: Mitchell G. Burton; Mark J. Wilson, both of Burnaby, Canada

[73] Assignee: Sierra Semiconductor Canada, Inc., Vancouver, Canada

[21] Appl. No.: 143,363

[22] Filed: Oct. 29, 1993

[51] Int. Cl.$^6$ .................................................. G06F 13/368
[52] U.S. Cl. .................................... 395/829; 364/DIG. 1; 364/238.3; 364/280.2; 364/284.2
[58] Field of Search ...................................... 395/284, 828, 395/830, 822, 829

[56] References Cited

U.S. PATENT DOCUMENTS

| | | | |
|---|---|---|---|
| 4,106,091 | 8/1978 | Hepworth et al. | 395/867 |
| 4,589,063 | 5/1986 | Shah et al. | 395/828 |
| 4,675,813 | 6/1987 | Locke | 395/829 |
| 4,787,030 | 11/1988 | Harter et al. | 395/405 |
| 4,815,034 | 3/1989 | Mackey | 395/884 |
| 4,849,931 | 7/1989 | Ishii et al. | 395/823 |
| 4,974,151 | 11/1990 | Advani et al. | 364/200 |
| 5,138,706 | 8/1992 | Melo et al. | 395/500 |
| 5,243,700 | 9/1993 | Larsen et al. | 395/822 |
| 5,257,387 | 10/1993 | Richek et al. | 395/800 |
| 5,367,640 | 11/1994 | Hamilton et al. | 395/829 |
| 5,371,892 | 12/1994 | Petersen et al. | 395/700 |
| 5,420,987 | 5/1995 | Reid et al. | 395/830 |
| 5,428,748 | 6/1995 | Davidson et al. | 395/829 |

OTHER PUBLICATIONS

Proposal for Plug and Play ISA Specification, Version 0.9, dated Mar. 27, 1993, pp. i–42, Copyright 1993 by Intel Corporation and Microsoft Corporation.

"IBM Personal Computer Hardware Reference Libary—Technical Reference", 1985, pp. 1–8 to 1–21.

Eggebrecht, Lewis "Interfacing to the IBM Personal Computer", 1990, pp. 158–169, 193–204.

*Primary Examiner*—Thomas C. Lee
*Assistant Examiner*—D. Dinh
*Attorney, Agent, or Firm*—Burns, Doane, Swecker & Mathis

[57] ABSTRACT

A mechanism is provided for software configuration of ISA bus cards or other devices connected to a computer processor by a bus that does not provide for sharing of an address by multiple devices. Such a device is configured under software control by selecting multiple addresses commonly used by a read-only device, writing from the computer processor to the configuration logic at one of such addresses a predetermined data word as part of a predetermined security access sequence, writing from the computer processor to the configuration logic at one of the addresses configuration information including a device based address, and the configuration logic, in response to the predetermined security access sequence, storing the configuration information in configuration registers, thereby configuring the device. The addresses used may be addresses used by a game device, such as a joystick. An apparatus for configuring such a device includes multiple configuration registers, circuitry for qualifying access to the configuration registers by verifying compliance with the predetermined security access sequence, the predetermined security access sequence including the central processor writing a predetermined data word to the configuration logic at one of multiple addresses commonly used by a read-only device, and circuitry for, in response to the predetermined security access sequence, storing in the configuration registers configuration information written by the computer processor to one of the multiple addresses, the configuration information including a device base address.

5 Claims, 13 Drawing Sheets

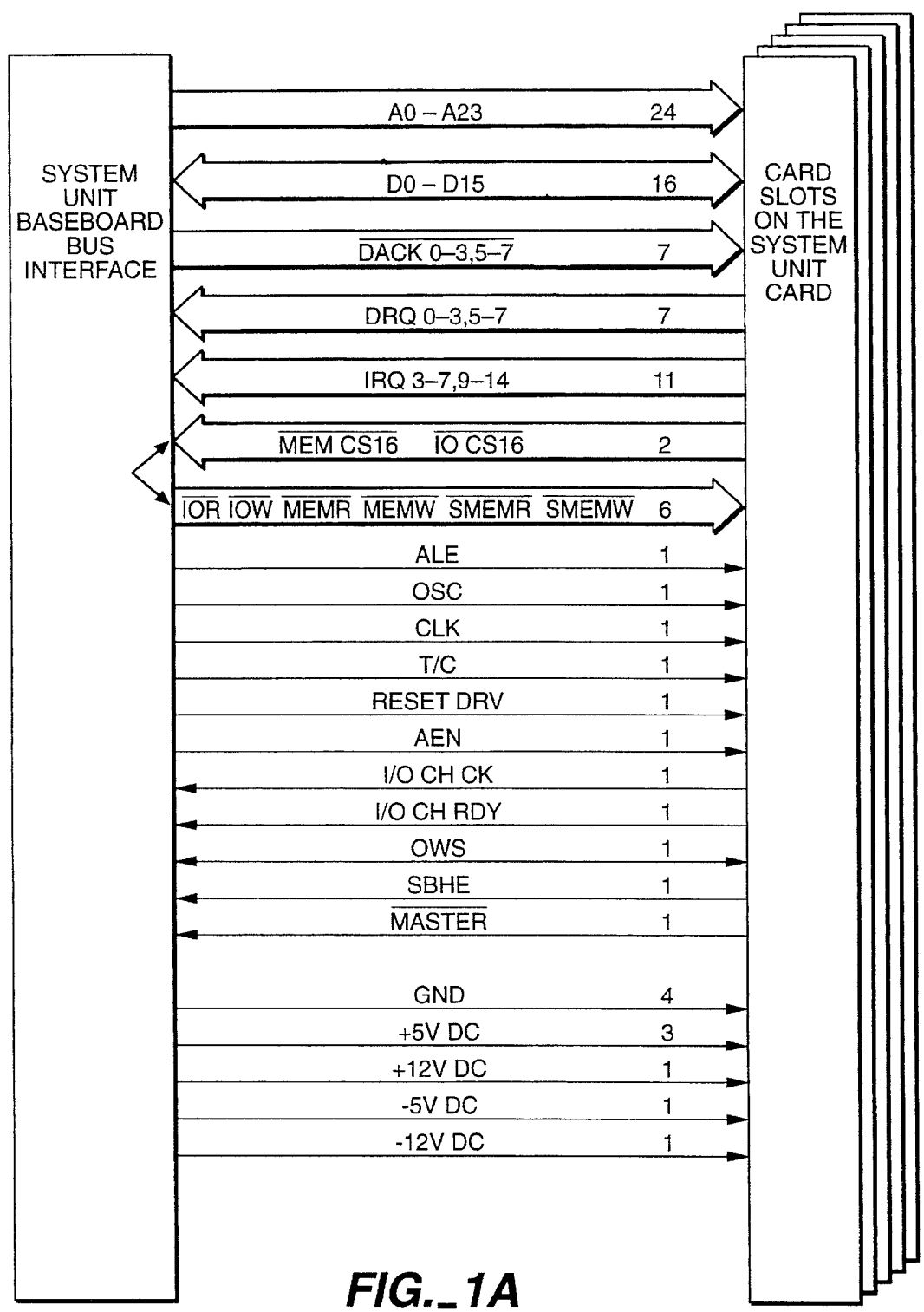
FIG._1A

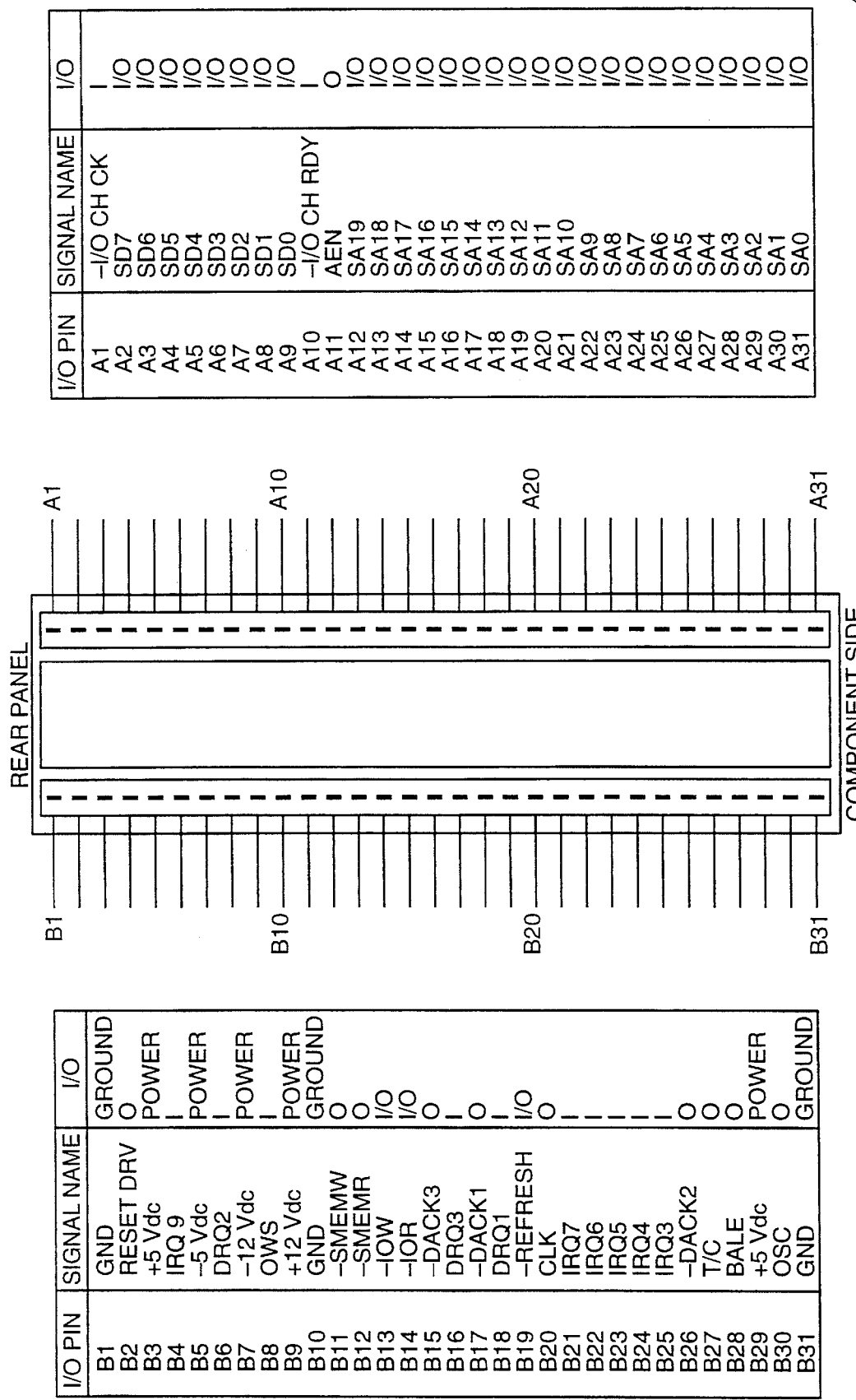
FIG._1B

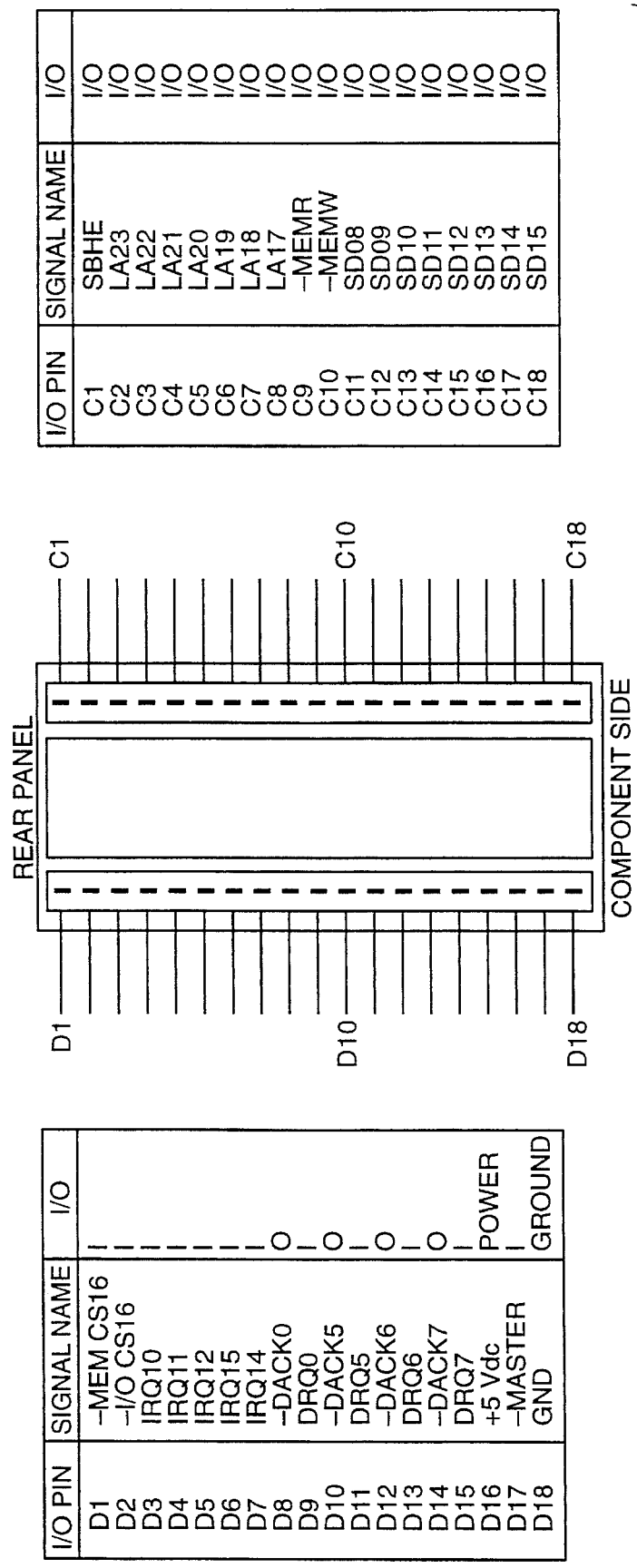
FIG._1C

| Address Range | Size | Hex Address | Uses |
|---|---|---|---|
| 0200H | 1 | 0200H | (NOT USED) |
| 0201H | 1 | 0201H | GAME CONTROL ADAPTER |
| 0202H–0277H | 118 | 0202H–0277H | (NOT USED) |
| 0278H–027FH | 8 | 0278H–027FH | SECOND PRINTER PORT ADAPTER |
| 0280H–02F7H | 120 | 0280H–02F7H | (NOT USED) |
| 02F8H–02FFH | 8 | 02F8H–02FFH | SECOND SERIAL PORT ADAPTER CARD |
| 0300H–0377H | 120 | 0300H–0377H | (NOT USED) |
| 0378H–037FH | 8 | 0378H–037FH | PRINTER PORT ADAPTER CARD |
| 0380H–03AFH | 48 | 0380H–03AFH | (NOT USED) |
| 03B0H–03BFH | 16 | 03B0H–03BFH | MONOCHROME AND PRINTER ADAPTER |
| 03C0H–03CFH | 16 | 03C0H–03CFH | (NOT USED) |
| 03D0H–03DFH | 16 | 03D0H–03DFH | COLOR/GRAPHICS ADAPTER |
| 03E0H–03EFH | 16 | 03E0H–03EFH | (NOT USED) |
| 03F0H–03F7H | 8 | 03F0H–03F7H | 5 1/4 INCH DISKETTE DRIVE ADAPTER CARD |
| 03F8H–03FFH | 8 | 03F8H–03FFH | SERIAL PORT ADAPTER CARD |

FIG._2

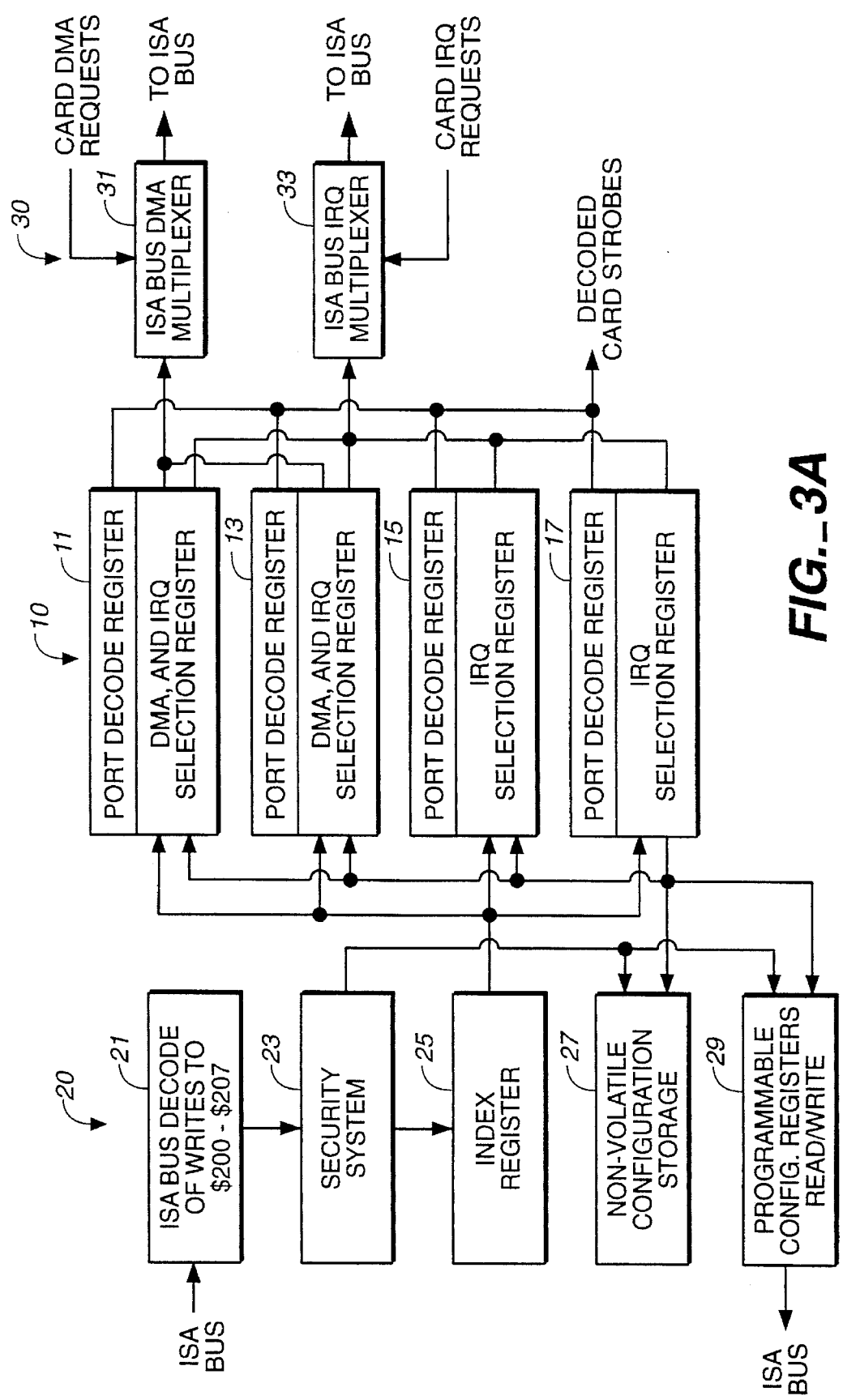
FIG._3A

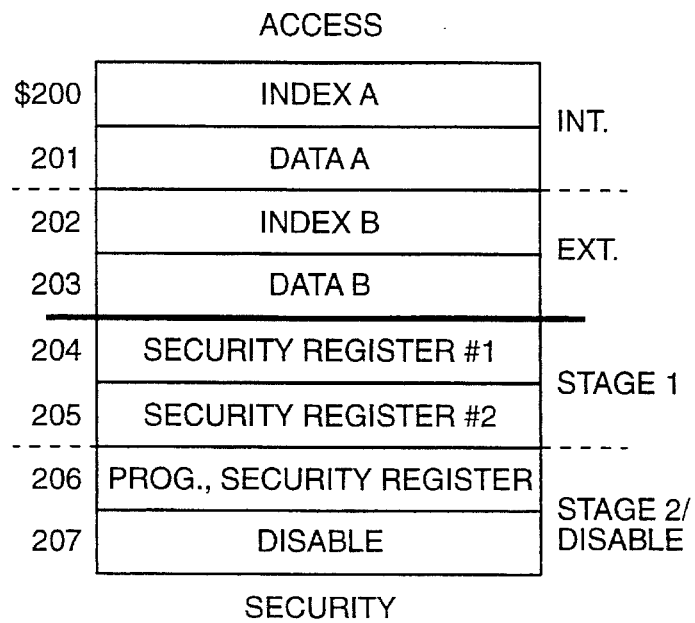
FIG._3B
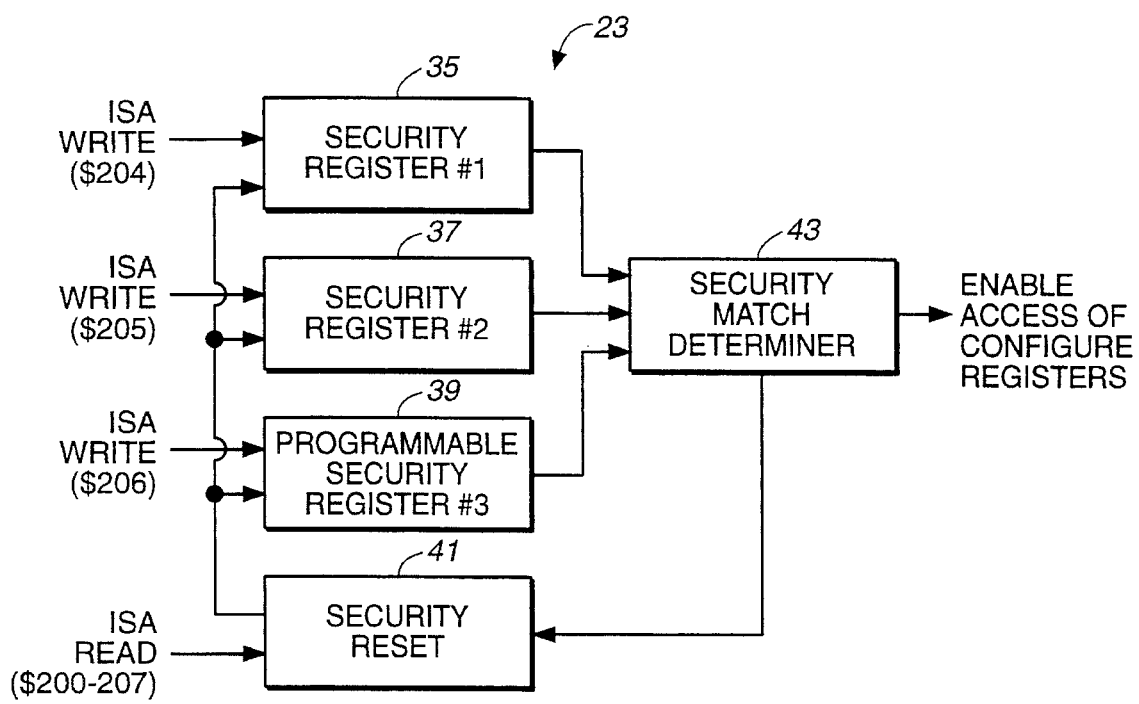
FIG._4

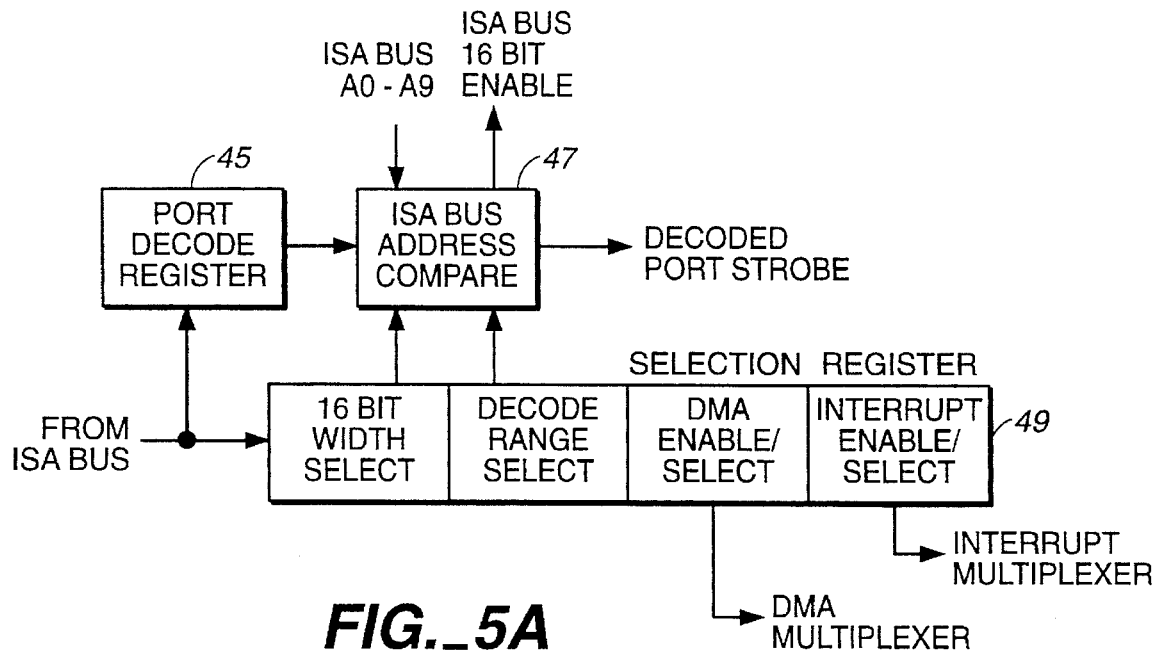
FIG._5A
FIG._5B

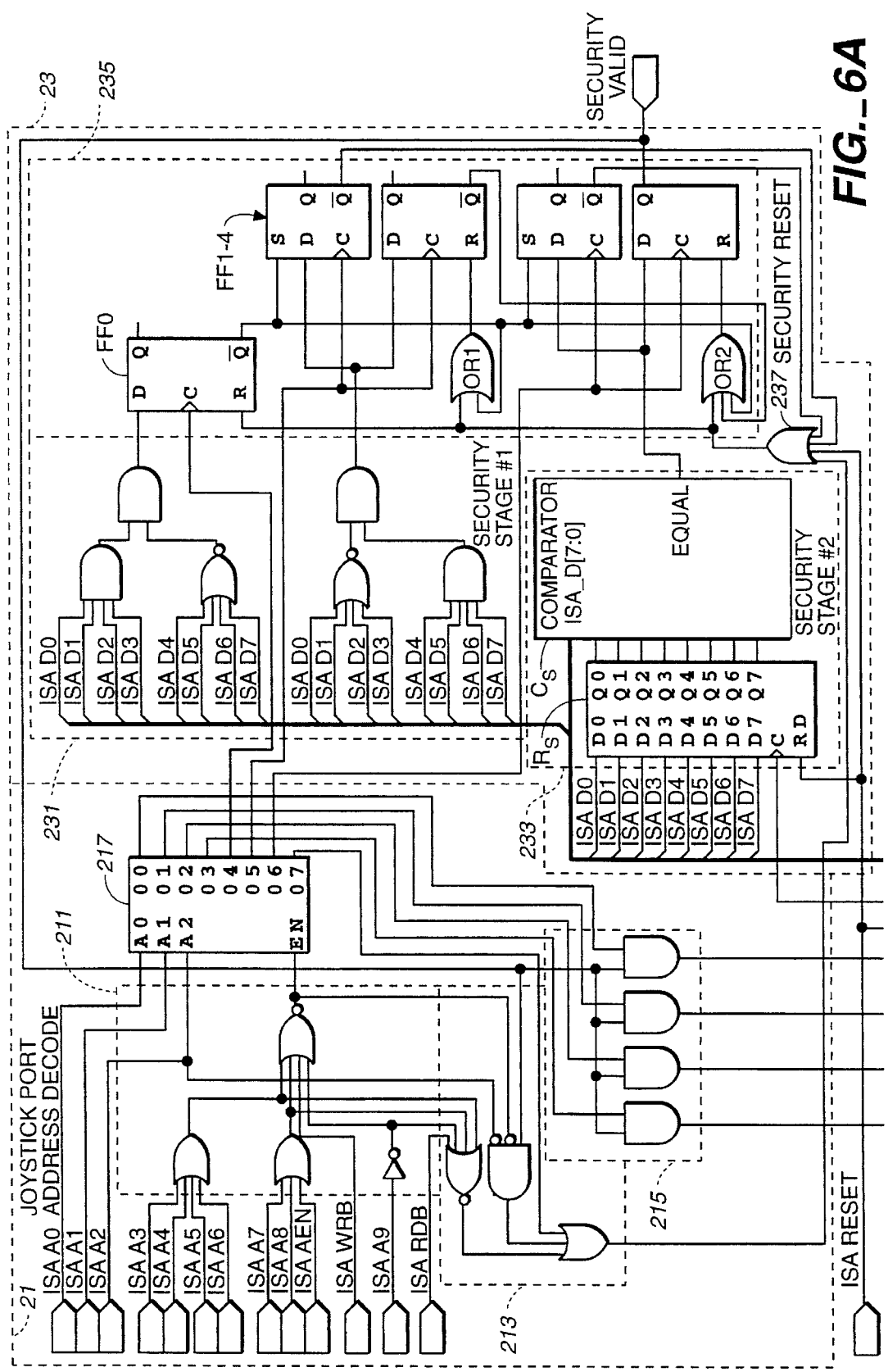
FIG._6A

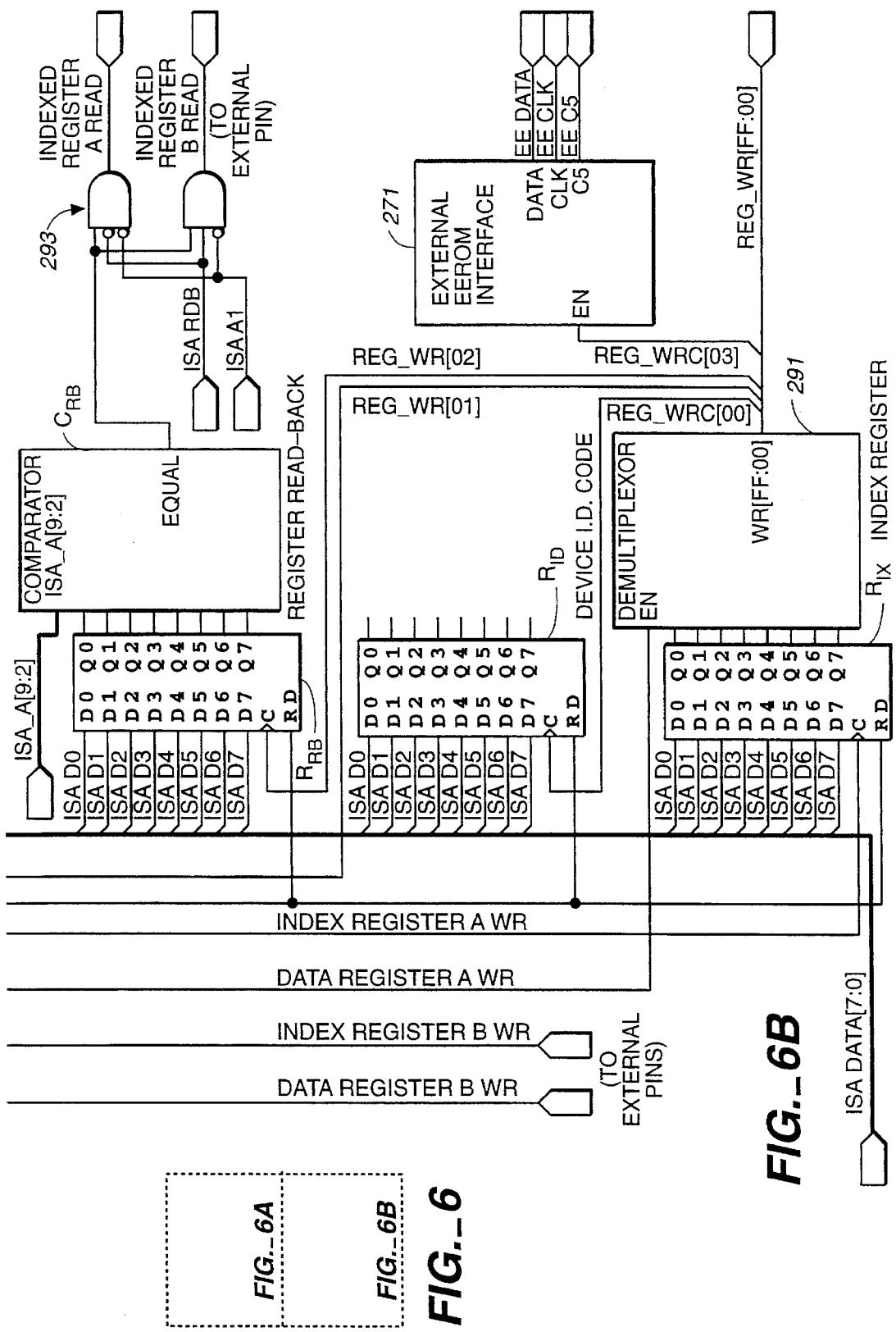

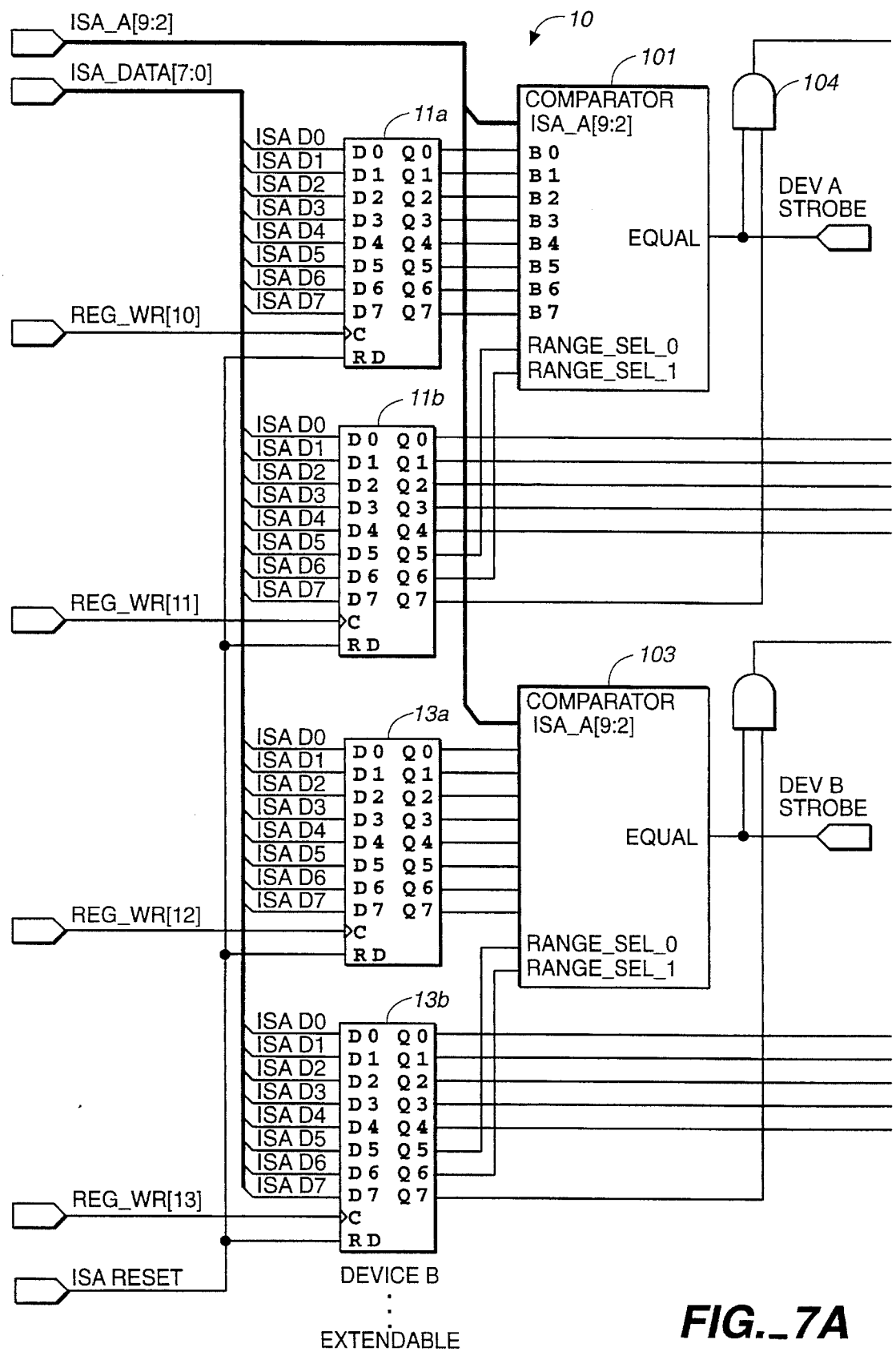
FIG._7A

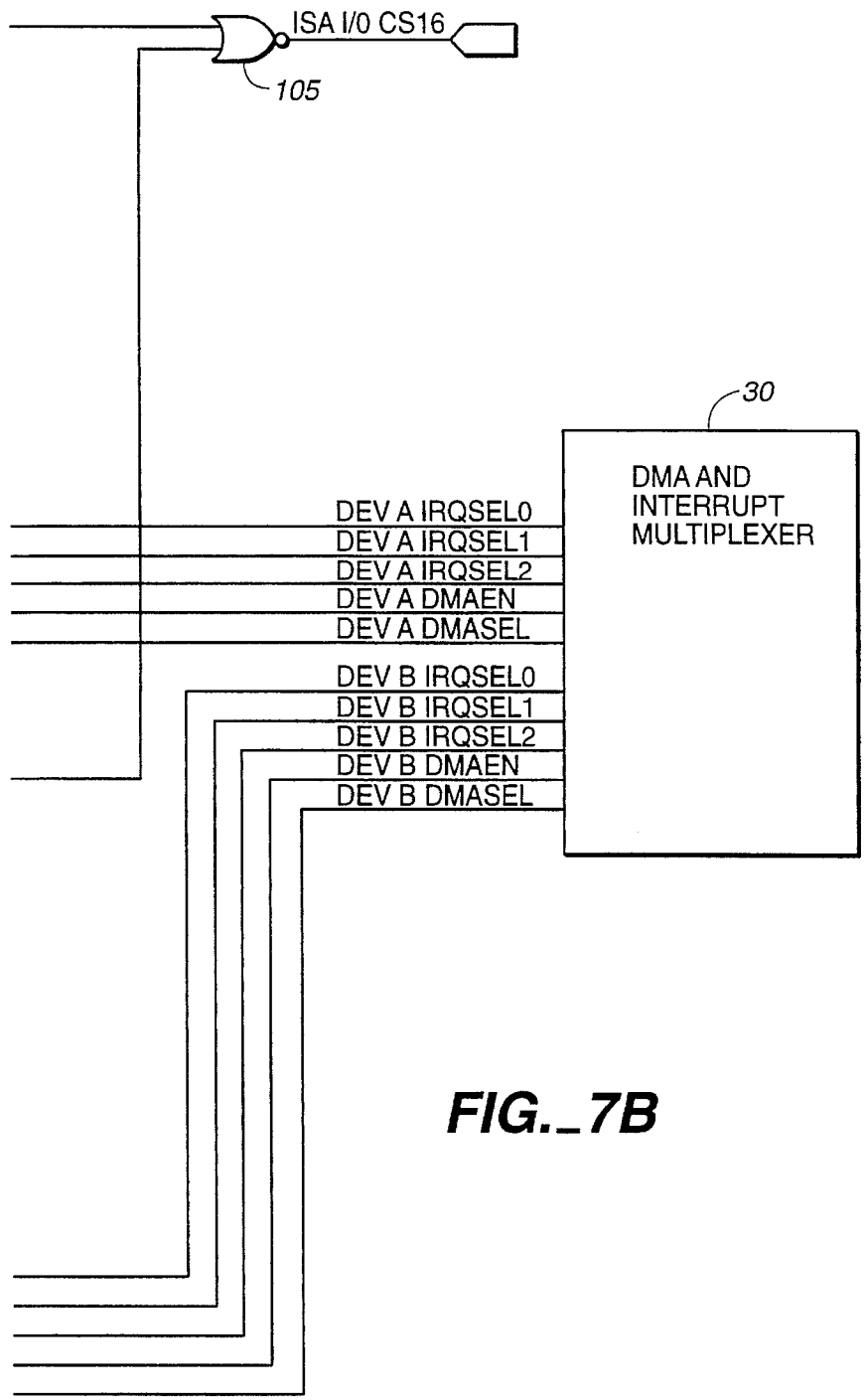
FIG._7B
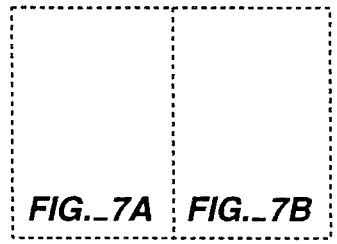
FIG._7

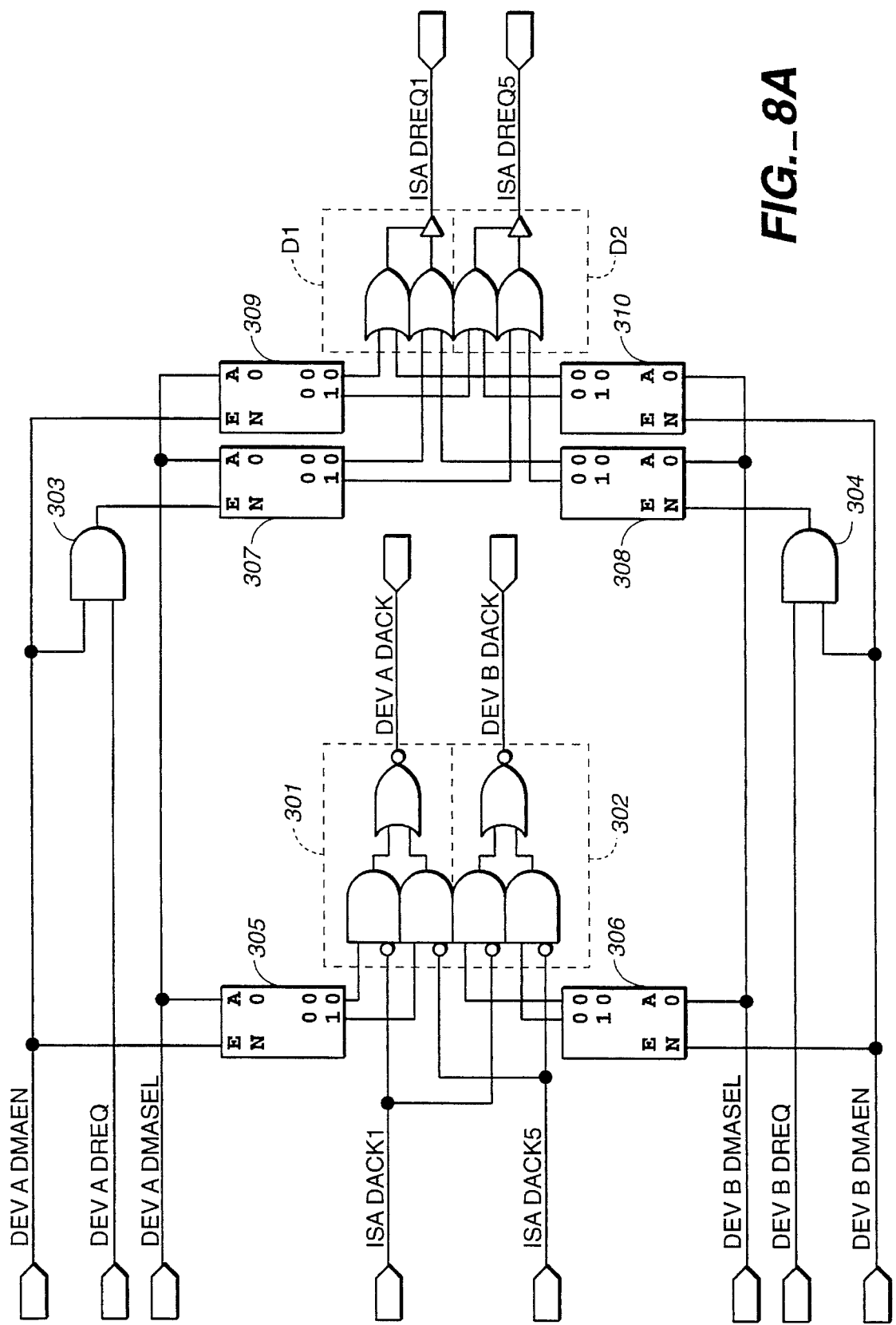
FIG._8A

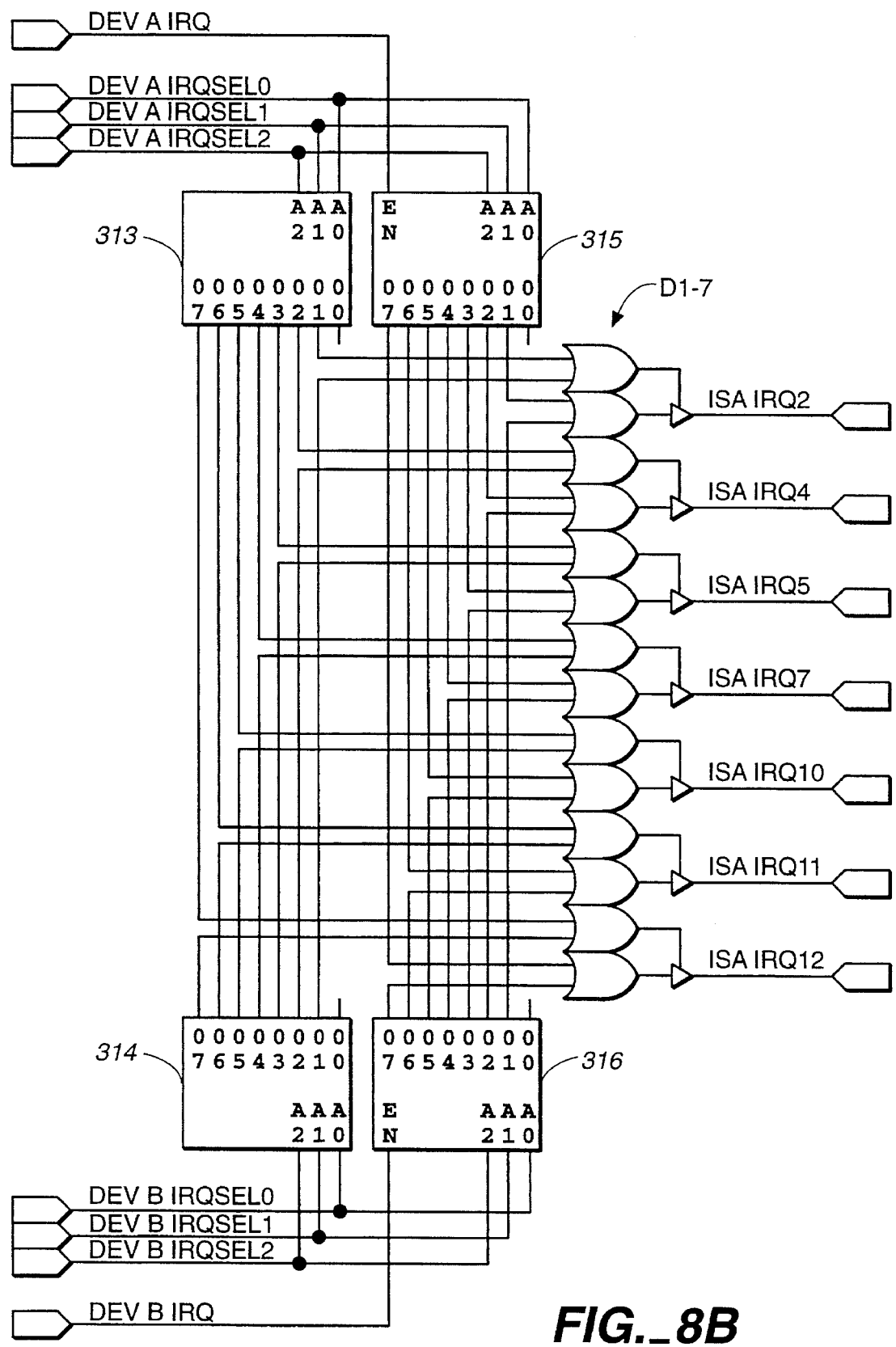
FIG._8B 5,522,086

SOFTWARE CONFIGURABLE ISA BUS CARD INTERFACE WITH SECURITY ACCESS READ AND WRITE SEQUENCE TO UPPER DATA BITS AT ADDRESSES USED BY A GAME DEVICE

BACKGROUND OF THE INVENTION

1. Field of the Invention

The present invention relates to configuration of computer add-in cards and more particularly to software configuration of cards for use in the IBM AT and compatible computers.

2. State of the Art

The industry standard architecture (ISA) bus is the most popular expansion standard in the PC industry. This bus architecture requires the allocation of memory and I/O address spaces, direct memory access (DMA) channels and interrupt levels among multiple ISA cards. However, the ISA interface has no defined hardware or software mechanism for allocating these resources. As a result, configuration of ISA cards is typically done with "jumpers" that change the decode maps for memory and I/O space and steer the DMA and interrupt signals to different pins on the bus. Further, system configuration files may need to be updated to reflect these changes. Resolving resource sharing conflicts typically involves shutting off power to the computer, opening the case, unplugging the board, getting the board manual out (if it can be found), changing the jumpers, then reinserting the board, powering up the machine, and repeating the process by trial and error until the system works. For the average user, this configuration process can be unreliable and frustrating.

Alternative bus standards (for example, the Micro-Channel Architecture, or MCA, and the Extended Industry Standard Architecture, or EISA) have hardware and software mechanisms to identify the resources requested by a card and resolve conflicts. These mechanisms are not compatible with the installed base of PCs with ISA card slots. Intel Corporation and Microsoft Corporation, in their Proposal for Plug and Play ISA specification, have jointly proposed a hardware and software mechanism for incorporation in a future generation of ISA cards that enables resolution of conflicts between such cards. The Plug and Play software allocates system resources between Plug and Play ISA cards without user intervention. Where current generation or standard ISA cards co-exist with Plug and Play ISA cards in the same system, however, the configuration solution is incomplete. In this and other respects, workability of the proposed specification depends upon its acceptance as a standard. Such acceptance is not assured, particularly in view of the complexity of the proposed mechanism. In the present-day commodity-like PC market, card vendors are loathe to add to their cards expensive, complicated hardware without some assurance of market success.

The present software board configuration mechanism, like the Plug and Play proposal, eliminates the cost and complexity of conventional jumper blocks and address decoding PALs, enabling a functional system to be configured without user intervention. The interface board can be reconfigured upon system reset, eliminating the frustrations associated with manual configuration and providing additional flexibility. Furthermore, unlike Plug and Play, the present software board configuration mechanism is not dependent upon adoption of the same mechanism by other boards.

SUMMARY OF THE INVENTION

The present invention, generally speaking, provides a mechanism for software configuration of ISA cards or other devices connected to a computer processor by a bus that does not normally provide for sharing of an address by multiple devices. The present invention provides a method of, under software control, configuring such a device by selecting multiple addresses shared by a commonly used device when that device is present on the bus, writing from the computer processor to the configuration logic at one of such addresses a predetermined data word as part of a predetermined security access sequence, writing from the computer processor to the configuration logic at one of the addresses configuration information including a device base address, and the configuration logic, in response to the predetermined security access sequence, storing the configuration information in configuration registers, thereby configuring the device. The addresses used may be addresses used by a game device, such as a joystick. An apparatus for configuring such a device includes multiple configuration registers, circuitry for qualifying access to the configuration registers by verifying compliance with a predetermined security access sequence, the predetermined security access sequence including the central processor writing a predetermined data word to the configuration logic at one of multiple addresses commonly used by a read-only device, and circuitry for, in response to the predetermined security access sequence, storing in the configuration registers configuration information written by the computer processor to one of the multiple addresses, the configuration information including a device base address.

BRIEF DESCRIPTION OF THE DRAWING

The present invention may be further understood from the following description in conjunction with the appended drawing. In the drawing:

FIG. 1a is a block diagram of the ISA bus;

FIGS. 1b and 1c are diagrams of the PC AT bus slot and the 16-bit ISA extension slot, respectively;

FIG. 2 is a map of card slot I/O port address usage defined for the ISA bus;

FIG. 3a is a block diagram of configuration logic enabling software configuration of ISA cards;

FIG. 3b is a usage map showing usage by software configuration logic (as opposed to a game device) of address locations normally reserved exclusively for the game device;

FIG. 4 is a block diagram showing in greater detail the security system of the configuration logic of FIG. 3a;

FIG. 5a is a block diagram showing in greater detail one of the configuration register pairs of the configuration logic of FIG. 3a; and FIG. 5b is a usage map of configuration registers in accordance with one embodiment of the invention.

FIGS. 6, 6A and 6B are more detailed schematic diagram of the logic 20 of FIG. 3a;

FIGS. 7, 7A and 7B are more detailed schematic diagram of the logic 10 of FIG. 3a; and FIGS. 8a and 8b are more detailed schematic diagrams of the logic 30 of FIG. 3a.

DETAILED DESCRIPTION OF THE PREFERRED EMBODIMENTS

The ISA bus provided a significant extension to the expansion slot bus architecture of the PC and the PC XT while maintaining backward compatibility with the PC and XT bus. The original PC system bus provided for the attachment of adapter devices at 5 to 8 different 62 pin card slots on the processor card. All of the card slots are bused with identical TTL signals on each pin, in addition to power and ground buses. The bus is essentially a demultiplexed and repowered superset of the Intel 8088 microprocessor bus with the 8088 bus signals being augmented by signals to support direct memory access, interrupts, timing control, I/O read, I/O write, memory read, memory write, wait state generation, memory refresh and error detection.

The extension to the PC bus provided by the ISA bus was implemented by adding a second 2×18 signal bus extension slot adjacent to the existing 2×31 PC and XT bus slot. As a result, the ISA bus provides support for both 8 and 16-bit wide data buses and support for both 20 and 24-bit memory addressing. Three 16-bit DMA channels were added together with six more interrupt request levels. The ISA bus provided higher speed bus cycles, support for zero wait state I/O bus cycles, support for alternate bus masters and support for larger adapter boards.

Referring to FIG. 1a, as detailed in Eggebrecht, *Interfacing to the IBM® Personal Computers*. (SAMS, 1990), the bus includes 24 address lines, 16 data lines and 50 control lines.

During DMA cycles, the processor is disconnected from the bus and the direct memory access controller controls the bus transfer. Signals DACK0 through DACK3 and DACK5 through DACK7 are active low output only signals issued by the DMA controller. They indicate that a corresponding DMA request (DRQ) has been honored and that the DMA controller will take the bus and proceed with the requested DMA cycle. The DMA request lines, DRQ 1 through 3 and DRQ 5 through 7, are active high input only lines used by the interface to request data cycles.

Lines IRQ 3 through 7 and IRQ 9 through 14 are input only signals used by the system bus to generate interrupt requests to the microprocessor. These signals go directly to an interrupt controller on the processor card. The interrupt controller is initialized to establish a hierarchy of priority between the different interrupt requests.

The I/O CS16 signal is shared by all bus devices. The I/O CS16 signal is an active low input signal that is used to indicate that the expansion slot adapter board can support a 16-bit I/O bus cycle (single wait state) on the present I/O bus cycle.

Details concerning the remaining signals not important to the understanding of the present invention may be found in Eggebrecht.

FIGS. 1b and 1c illustrate the configuration of an ISA bus slot. The 62 signal 8-bit bus slot of FIG. 1c preserves (with minor exceptions) the definitions of the original PC and PC XT, while the 16-bit PC AT extension slot of FIG. 1b provides the additional functionality of the ISA bus.

During I/O reads and I/O writes, expansion boards typically decode only address lines A0 through A9, defining an I/O address space of 0000 through 03FF hex. The first part of this address space, 0000 through 01FF, is used to address microprocessor support devices. These addresses are therefore not used as either input or output ports, leaving addresses 0200 through 03FF. An I/O address space map shown in FIG. 2 defines in general terms a usage scheme for this I/O address space. As the rapid rate of expansion card development continues, however, more and more of the supposedly unused address spaces are used, making an accurate map of usage of the I/O address space impossible to maintain.

A difficult problem in providing a software (or a "jumperless") ISA bus board configuration is therefore defining an address at which the board configuration logic can be accessed. The ISA bus is designed in such a way that the I/O space is unique; i.e., the ISA bus will only allow one device to use each address location in the I/O space. If more than one device uses a given address, a conflict arises. As shown in FIG. 2, the I/O space designated for the ISA system's own internal operation is limited and is made available for use by various expansion cards. The bulk of the address space has been left open to all ISA peripheral designers without restriction. Designers have been forced to allow their peripherals to be accessed at a variety of addresses so that the peripherals installed on a given ISA bus may be shuffled around until no addressing conflicts are present. Without conflict-free access to a specific I/O address, a peripheral's configuration logic becomes subject to the very problem which it seeks to solve.

Certain peripheral register mappings defined by IBM, however, have become universally accepted. These nonrelocatable peripherals include the parallel ports, serial I/O ports, and the "game" or "joystick" port, all of which are present in most ISA systems and whose addresses therefore have not been used by other peripheral designers. The present software configuration mechanism is based on a method of sharing addresses on an ISA bus (not designed to sham a given address location) with these standard peripherals in such a way that a conflict does not arise.

Such sharing must not, of course, interfere with normal operation of the ISA bus or the peripheral whose space is being shared. This criteria is most readily met by using the joystick port on the ISA bus, which is always located at addresses 0200 to 0207 hexadecimal. The normal function of the joystick port is as a read only port. Its read-only nature makes it ideal for sharing with a configuration register. A write cycle to the joystick port resets the joystick's timers; the data written, however, is ignored. Data can therefore be written to a configuration register based at the joystick adapter address without affecting joystick operation. Furthermore, by defining the configuration register to be write only, I/O read conflicts at the port are also avoided. An I/O read of the port will only read the joystick information.

During the actual use of the joystick port, a game program, to reset the timers of the joystick interface, may write to the joystick port either a fixed value or a random value. To prevent potentially random values from being written to the configuration register so as to cause unpredictable operation of its associated expansion card, a security access sequence is defined. Once the security access sequence has been verified, a set of configuration registers (512 in a preferred embodiment) may be written to through the joystick port using using register indexing and may be read back using either of two alternative mechanisms, to be described. The configuration registers provide port decode and selection registers for decoding port strobes and enabling and selecting DMA channels and interrupt levels for multiple logical devices on a particular card. The port strobes select the logical devices for ISA bus activity. DMA channel and interrupt level select signals control multiplexing circuitry that behaves in essence like a switch block, routing DMA requests and interrupt requests from the different logical devices onto various ones of the ISA bus DRQ and IRQ lines.

Referring now to FIG. 3a, the present software configurable ISA bus card interface is preferably realized in the form of an integrated circuit, for example, an application specific integrated circuit (ASIC). The configuration registers 10 are read from and written to by logic 20 and produce outputs to logic 30 for effecting device configuration. ISA bus decode logic 21 is connected to the ISA bus and decodes writes to the joystick port at addresses $200–$207. Addresses in this range and data written to those addresses are monitored by the security system 23, which enables access of the configuration registers 10 through programmable configuration registers read/write logic 29 when the security access sequence has been successfully completed. The particular configuration register written to or read from is determined by the contents of an index register 25. When access of the configuration registers is enabled through the security system 23, the index register 25 may be written to at an address in the $200–$207 range.

Non-volatile configuration storage 27 is connected to the configuration registers 10, the contents of which may be written to non-volatile storage upon command. As described more fully below, non-volatile storage enables cards required to participate in the boot process to come up active and is required if a system is to have more than one software configurable card.

A configuration register or group of configuration registers is provided for each logical device on the I/O card. In FIG. 3a, register groups 11, 13, 15 and 17 are provided for four respective logical devices. In a preferred embodiment, each register group includes two registers, a port decode register and an IRQ and/or DMA selection register. Using the contents of the respective decode registers, card strobes are decoded and provided to the different logical devices. The IRQ registers of register groups 15 and 17 are input to an ISA bus IRQ multiplexer 33. The multiplexer 33 receives card IRQ requests from the logical devices and according to the contents of the IRQ selection registers routes those requests to particular ones of the interrupt request lines of the ISA bus. The multiplexer 33 is also connected to selected bits of DMA and IRQ selection registers of register groups 11 and 13. The ISA bus DMA multiplexer 31 is connected to other selected bits of the DMA and IRQ registers of register groups 11 and 13. In analogous fashion as the multiplexer 33, the multiplexer 31 receives card DMA requests from the logical devices and routes those requests to various DRQ lines on the ISA bus.

Different addresses in the range $200–$207 are used for different purposes as shown in FIG. 3b. (At the same time, the addresses may be used in the conventional manner as the joystick port.) The preprogramming security hardware is accessed at joystick port addresses $204–$207. By requiring that a multi-byte security access sequence be written to the configuration logic, accidental corruption of the configuration registers by programs using the joystick port is prevented. Additional protection is provided by denying access to the security register if a read is performed between writes, as would be the case if a joystick read routine were being executed.

In order to ensure that the security system is completely reset, an initial read of any address in the range $200–$207 should be made. Thereafter, a first stage of the security system is enabled by writing a predetermined data byte to a first security register at address $204 followed by writing another predetermined data byte to a second security register at address $205.

A second security stage is enabled by writing to a programmable security register at address $206 an 8-bit security code individual to each card. In systems with non-volatile storage, this code will be unique. In systems without any non-volatile storage in which to the store special code, this code will default to $00.

The security system can be disabled at any point by: initiating a write of address $207; reading any address from $200–$207; or writing an incorrect value to locations $204–$206. Access is also disabled if a write to any of locations $200–$203 occurs during the first stage security sequence.

FIG. 4 illustrates in greater detail the security system 23 of FIG. 3a. Security registers 1, 2, and 3 (elements 35, 37 and 39, respectively) each store the data byte written to a respective one of addresses $204–$206. The contents of these registers are input to a security mask determiner 43 which enables access of the configuration registers when the security access sequence is correctly carried out. If at any time during the security access sequence the correct step is not performed, the security mask determiner 43 signals security reset logic 41, causing the contents of the security registers 35, 37, and 39 to be reset. The security reset logic 41 also causes the contents of the security registers to be cleared whenever any of the joystick addresses $200–$207 is read.

Referring again to FIG. 3b, the configuration registers are located at addresses $200–$203 and can be written any number of times in any order after the security sequence has been initiated to allow access to the configuration registers. This address range is divided into two pairs of registers. One pair of registers is used to set the configuration parameters of internal (on chip) configuration registers. The other pair of registers are decoded to external pins to set configuration parameters of additional external configuration registers. This feature allows for expandability.

Each pair of registers includes an index (select) register and a data port register. The index register specifies the configuration register that is written by subsequent writes to the data location or read by subsequent, reads to the data location. In an embodiment in the invention that minimizes pin count, the data path is 8-bits wide. If, for example, the value $10 were written to the index register at address $200, the sixteenth configuration register of 256 configuration registers (numbered 0–255) could then be written by performing an I/O write at the data port address $201.

Referring to FIG. 5b, certain of the configuration registers are reserved for particular functions. Configuration register 0 stores an 8-bit device type I.D. code. Configuration register 1 stores an 8-bit second stage unique security code. This code defaults to $00 after reset, but may be written (or loaded from non-volatile storage) by the configuration program to allow multiple cards to use different instances of the same configuration logic on a single ISA bus system.

Configuration register 2 is a register which defines an ISA bus I/O address where the configuration registers may be read back from the software configuration logic. This read back mode is only active when the security access is enabled and the readback address register is programmed to an address other than $00. The specified address defines an 8-bit ISA bus I/O access port. A value of $00 in this register disables read back. The configuration register which is read back is determined by the value programmed in the index register. This 8-bit I/O access read back data location may be programmed to any 4-byte boundary in the 1024 bit I/O space except $00.

An alternative method of configuration readback makes use of a 16-bit I/O access of the joystick port to prevent conflict. The joystick port is an 8-bit port. Due to the implementation of ISA bus, the 16-bit I/O enable line is normally unconnected when the joystick port addresses are accessed. By asserting the 16-bit I/O line upon a read of the joystick port, the upper 8-bits of the data bus can be used to read back configuration information. The joystick port is not affected, since it does not connect to the 16-bit data bus or control lines. This method will, however, return invalid joystick data if an odd port address is read by a joystick read routine. In an odd port address read, data is placed on the upper 8-bits of the data bus. To prevent this problem, the 16-bit I/O readback mode is only active when the security sequence has been initiated and the readback register has been enabled (is non-zero). The configuration register which is read back is determined by the value programmed into the index register. Configuration software must then disable this readback mode for proper joystick operation.

Configuration register 3 implements a configuration store command. An independent non-volatile storage interface may be provided on-chip to allow direct interfacing to a serial non-volatile storage device. This interface is enabled through an external mode select pin. When enabled, this interface automatically loads the configuration after RESET and will store the configuration on command. Writing a "1" to bit zero will initiate a configuration store if the independent non-volatile storage interface is enabled. Alternatively, a microcontroller on the card provided with its own non-volatile storage may use the index-register/data-register pairs to access and program the configuration registers based on its own non-volatile storage.

Although non-volatile storage for the configuration is optional, there can be only one card in each system that does not use non-volatile storage to store a unique security code. Otherwise, conflicts will arise when upon power-up the individual configuration registers all default to $00, making it impossible to distinguish between different software configuration cards in the system.

Configuration registers $4-F are reserved for system use. The remaining configuration registers are available for use in configuring devices. In a preferred embodiment, two configuration registers are used to configure each device, a port decode register and a selection register.

Referring more specifically to FIG. 5a, both the port decode register 45 and the selection register 49 are programmed from the ISA bus. The port decode register 45 and a portion of the selection register 49 are connected to ISA bus address comparison circuitry 47. This portion of the selection register performs a base address control function, selecting from a decode range of 8, 16, or 32 bytes, or disabling the address comparison. Although a particular base address may be specified in the port decode register 45, a range of addresses 8, 16 or 32 bytes deep is decoded depending on the decode range select value programmed in the selection register 49. The ISA address comparison circuitry 47 receives the decode range select signal from the selection register 49, the base address value from the port decode register 45 and address bits A0–A9 from the ISA bus and produces a decoded port strobe when the address appearing on the ISA bus is within the specified decode range of the base address. A 16-bit width select bit controls whether the ISA bus 16-bit enable signal is asserted during decoded accesses, resulting in 16-bit data transfers, or deasserted, resulting in 8-bit data transfers.

The remaining portion of the selection register 49 is used to enable and select DMA channels and interrupt levels. Bits from a DMA enable/select portion of the selection register 49 are input to the DMA multiplexer 31 of FIG. 3, and bits from an interrupt enable/select portion of the selection register 49 are input to the interrupt multiplexer 33 of FIG. 3.

Interpretation of the bits of the port decode register and the selection register for a first software configurable device in accordance with an exemplary embodiment of the invention is set forth below in Table 1.

TABLE 1

Configuration Register 10 - Port Decode Register #1

| X | X | X | X | X | X | X | X | Depth: 00 |
|---|---|---|---|---|---|---|---|---|
| A9 | A8 | A7 | A6 | A5 | A4 | A3 | X | 01 |
| A9 | A8 | A7 | A6 | A5 | A4 | X | X | 10 |
| A9 | A8 | A7 | A6 | A5 | X | X | X | 11 |

Configuration Register 11 - Selection Register #1

| Bit | | | IRQ Select bits | | |
|---|---|---|---|---|---|
| 0 | IRQ select | | | | |
| 1 | IRQ select | | 2 | 1 | 0 |
| 2 | IRQ select | | | | |
| 3 | DMA select | | 0 | 0 | 0 | disable |
| 4 | DMA enable (1) | | 0 | 0 | 1 | IRQ 2 |
| 5 | Decode Depth | | 0 | 1 | 0 | IRQ 4 |
| 6 | Decode Depth | | 0 | 1 | 1 | IRQ 5 |
| 7 | (1) Enable I/O CS16 signal | | 1 | 0 | 0 | IRQ 7 |
| | | | 1 | 0 | 1 | IRQ 10 |
| | | | 1 | 1 | 0 | IRQ 11 |
| | | | 1 | 1 | 1 | IRQ 12 |

| Depth Decode | |
|---|---|
| Bit 6 | Bit 5 |
| 0 | 0 | disable |
| 0 | 0 | 8 bytes |
| 1 | 0 | 16 bytes |
| 1 | 1 | 32 bytes |

The contents of the port decode register are subject to four different interpretations in accordance with the contents of the decode depth bits 5 and 6 of the selection register. When these bits are programmed with the value of zero, all of the bits of the port decode register are treated as "don't cares", and the port strobe is not activated regardless of the address appearing on the ISA bus. When the decode depth bits contain a value of binary 01, the least significant bit of the port decode register is treated as a "don't care" and the most significant 7-bits are compared with address bits A3–A9 of the ISA bus. When the decode depth bits are programmed with a value of binary 10, the two least significant bits of the port decode register are treated as "don't cares", and when the decode depth bits are programmed to a value of binary 11, the three least significant bits of the port decode register are treated as "don't cares".

Three bits of the selection register are used to perform IRQ select, providing for seven interrupt levels and a disable state. One DMA select bit is provided and one DMA enable bit is provided. The device may therefore be configured to use one of two possible DMA channels, and DMA may be enabled or disabled.

The present ISA bus card software configuration mechanism is shown in greater detail in FIGS. 6, 7, 8a and 8b. For simplicity, configuration of a two-device system is shown, although the design may be readily expanded to accommodate any number of devices. FIG. 6 shows in detail logic 20 of FIG. 3a, FIG. 7 shows in detail logic 10 of FIG. 3a, and FIGS. 8a and 8b show in detail logic 30 of FIG. 3a.

Referring to FIG. 6, joystick port address decode logic 21 includes a first group of logic gates 201 for decoding addresses in the range $200–207, a second group of logic gates 203 for disabling access under the conditions previously described, and a third group of logic gates 205 for enabling access to different registers of the internal index/data register pair and the external index/data register pair. The joystick port address decode logic receives as inputs ISA address bits A[9:0], ISA read/write signals $\overline{RD}$ and $\overline{WR}$ and the ISA address enable signal AEN. A 3-to-8 bit decoder 207 is enabled whenever the joystick port is addressed and asserts one of its output signal depending on which of the joystick port address locations has been addressed.

Security logic 23 includes first security stage logic 231, second security stage logic 233, a security logic state machine 235 and security reset logic 237. Upon system reset, of the flip-flops FF1–4, flip-flops FF1 and FF3 are set and flip-flops FF2 and FF4 are reset. The state stored in flip-flops FF1-4 is therefore $0_4 1_3 0_2 1_1$. In the illustrated embodiment, the arrangement of logic gates in the first security stage 231 is such that the first byte of the security access sequence is $F0. Writing $F0 to address location $204 causes a 1 to be latched into flip-flop FF0. This action "unlocks" flip-flops FF1–3 so that their states may be changed. The second byte of the security access sequence is $0F. Writing $0F to address location $205 causes a 1 to be latched into flip-flops FF1 and FF2. The state of the flip-flops is then 0111. This action "unlocks" flip-flop FF4 so that its state may be changed.

The second security stage includes the programmable security register $R_S$ and a comparator $C_S$. The programmable security register is reset on power-up and may be subsequently written to at address location $201 of the internal index/data register pair. When the programmable security register is subsequently addressed at address location $206, the results of a comparison between the contents of the programmable security register and a value driven on the low-order byte of the data bus is latched into flip-flops FF3 and FF4. If the value driven on the bus and the value stored in the programmable register coincide, a 1 is latched into flip-flops FF3 and FF4, causing a state transition to 1111. The SECURITY VALID signal is then driven high.

Any deviation from the correct security access sequence causes reset of the circuit by means of OR gates OR1 and OR2, and OR gate 237 forming the security reset circuit. The security reset circuit also resets the circuit under the conditions described previously.

With the exception of the identification register $R_{ID}$ and an external non-volatile storage (EEROM) interface 271, the remaining circuitry is part of the programmable configuration registers read/write logic 29 (FIG. 3a). The internal index register is $R_{IX}$ is written to at address location $200. The contents of that register are then decoded using a demultiplexer 291 to produce 256 register write signals RE6 WR[FF:00]. Register write signal REG WR[00] selects the identification register $R_{ID}$ to be written with the device I.D. code. Register write signal REG WR[03] enables the external EEROM interface 271 for a configuration store operation. Register write signal REG WR[01] selects the programmable security register $R_S$ to be written with the programmable security code.

Register write signal REG WR[02] selects the read-back register $R_{RB}$ to be written with the read back address. This address is then compared with address values driven on the ISA bus using a read-back comparator $C_{RB}$. When the ISA bus signal RD is asserted, logic gates 293 causes one of two signals to be asserted according to whether the read operation is of an internal configuration register (A1=0) or an external configuration register (A1=1).

Referring to FIG. 7, the configuration registers 10, in a preferred embodiment, include two registers for each device. As described previously in relation to Table 1, the first register is programmed with the device base address, whereas the second register is programmed with address decode depth, DMA select and enable, and IRQ select information. For a first device, "DEVICE A", therefore, the base address stored in register 11a is input to a comparator 101 where it is compared with an address on the ISA bus in accordance with range select signals input from bits five and six of register 11b. When equality is detected, the DEVICE A STROBE is activated. Logic gates 104 and 105 control whether the I/O CS16 signal is asserted according to bit seven of the register 11b. The lower order bits 0–4 of register 11b are input to the DMA and interrupt multiplexer 30. Corresponding elements associated with DEVICE B and other possible devices are arranged and operate in corresponding fashion.

FIGS. 8a and 8b show the DMA and interrupt portions, respectively, of the DMA and interrupt multiplexer 30. Referring first to FIG. 8a, showing the DMA portion, three 1-bit decoders 305, 307, and 309 are provided for DEVICE A and three 1-bit decoders 306, 308, and 310 are provided for DEVICE B. The outputs of the various decoders are determined by the DMA enable and select bits and the DMA request signal for each of the devices. Combinatorial logic 301 and 302 is responsive to the outputs of the decoders 305 and 306 and to the ISA bus DMA acknowledge signals to drive the respective DMA acknowledge signals to the two devices. Line drivers circuits D1 and D2 are responsive to the outputs of the decoders 307–310 to drive the ISA bus DMA request lines. In the illustrated embodiment, only two DMA channels are made available, namely DMA channels 1 and 5. In other embodiments more DMA channels may be provided.

Referring to FIG. 8b, the interrupt request select bits of each device are connected to a pair of decoders, decoders 313 and 315 in the case of DEVICE A and decoders 314 and 316 in the case of DEVICE B. Decoders 315 and 316 are, in addition, connected to the DEVICE A interrupt request line and to the DEVICE B interrupt request line, respectively. Seven drivers D1–7 drive seven interrupt request lines (IRQ2, IRQ4, IRQ5, IRQ7, and IRQs 10–12). Each of the drivers has four input signals, two input signals feeding a first OR gate and two input signals feeding a second OR gate. For each driver one of the OR gates is connected to a corresponding one of the output signals of both decoders 313 and 314, and the other OR gate is connected to a corresponding one of the output signals of both decoders 315 and 316.

In operation, if, for example, DEVICE A is configured to use IRQ2, IRQ select bits 001 would be input to the decoders 313 and 315. (If IRQ select bits 000 are input, interrupts are disabled for that device). When DEVICE A generated an interrupt request, the decoder 315 would be enabled, causing its output Q1 to be asserted. The decoder 313 is always enabled and will have already asserted its output Q1. The driver D1 is therefore activated to drive IRQ2.

The described ISA bus card software configuration mechanism provides a robust, cost-effective solution to the ISA configuration problem, addressing a major concern of the average computer user. The mechanism also allows implementation trade-offs to be made depending on the functionality and market for each card. A low-cost system, for example, might contain no non-volatile storage and support only 8-bit data transfers. A more versatile system would include non-volatile storage and allow for 16-bit data transfers. The flexibility of this system will make it attractive not only to end users but to system integrators, ISA card manufacturers and operating system vendors.

The foregoing has described the principles, preferred embodiments and modes of operation of the present invention.

However, invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of, under software control, configuring a device connected to configuration logic having a plurality of configuration registers and connected to a computer processor by a bus that does not normally provide for sharing of an address by multiple devices, comprising the steps of:

selecting a plurality of addresses shared by a commonly used device when that device is present on the bus wherein said plurality of addresses are addresses used a game device that uses only M of N available data lines on said bus, where $M \leq N$;

writing from the computer processor to the configuration logic at one of the plurality of addresses a predetermined data word as part of a predetermined security access sequence;

writing from the computer processor to the configuration logic at one of said plurality of addresses configuration information including a device base address; and the configuration logic, in response to said predetermined security access sequence, storing the configuration information in the configuration registers by performing a P-bit read from one of said plurality of addresses, where $M<P \leq N$ and placing configuration information on ones of said data lines of higher order than M, thereby configuring the device.

2. The method of claim 1 wherein said plurality of addresses are addresses used by a joystick.

3. The method of claim 1 wherein the configuration information includes a configuration information readback address.

4. The method of claim 3, comprising the further step of reading configuration information from the configuration logic to the computer processor from the configuration information readback address.

5. The method of claim 4, wherein the configuration logic further includes non-volatile storage, the method comprising the further steps of:

prior to power down, storing the configuration information in said non-volatile storage; and at next power up, reading the configuration information from said non-volatile storage to the configuration registers.

* * * * *